United States Patent [19]
Eastman

[11] Patent Number: 6,134,906
[45] Date of Patent: Oct. 24, 2000

[54] REFRIGERATOR WITH VIDEO MONITOR WORKSTATION

[76] Inventor: Winthrop A. Eastman, 515 Venice St., Sugar Land, Tex. 77478

[21] Appl. No.: 09/321,892

[22] Filed: May 31, 1999

[51] Int. Cl.[7] .................................................. F25D 15/00
[52] U.S. Cl. ............................... 62/331; 62/3.6; 62/457.9
[58] Field of Search .................................. 62/331, 457.9, 62/3.6

[56] References Cited

U.S. PATENT DOCUMENTS

| | | | |
|---|---|---|---|
| 5,319,937 | 6/1994 | Fritsch et al. | 62/3.62 |
| 5,501,076 | 3/1996 | Sharp, III et al. | 62/3.6 |

*Primary Examiner*—William Doerrler
*Assistant Examiner*—Melvin Jones
*Attorney, Agent, or Firm*—Alan J. Atkinson

[57] ABSTRACT

A video monitor attached to a refrigerator for combining visual graphic display with the functional capability to store and access refrigerated products. Near continuous workstation operation can be conducted while permitting access to refrigerated food and beverage products. Access to the refrigerator interior can be made through a moveable video screen or through a side door. A controller can be engaged with the video monitor for transmitting graphic data, and a keyboard can provide interactive control over the displayed information. The video monitor and refrigerator can be portable to extend the flexibility of workstation operation.

18 Claims, 2 Drawing Sheets

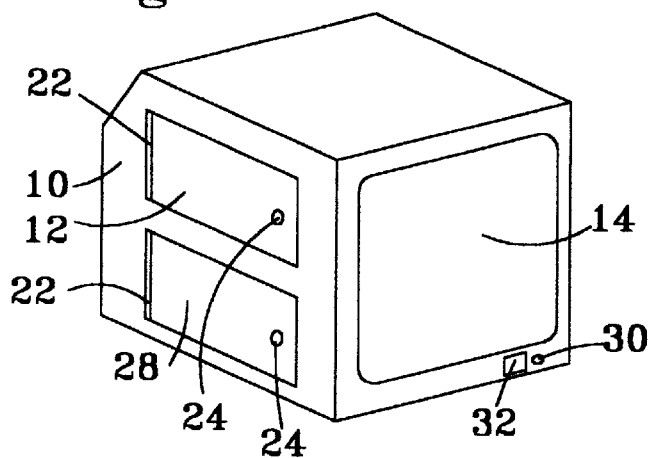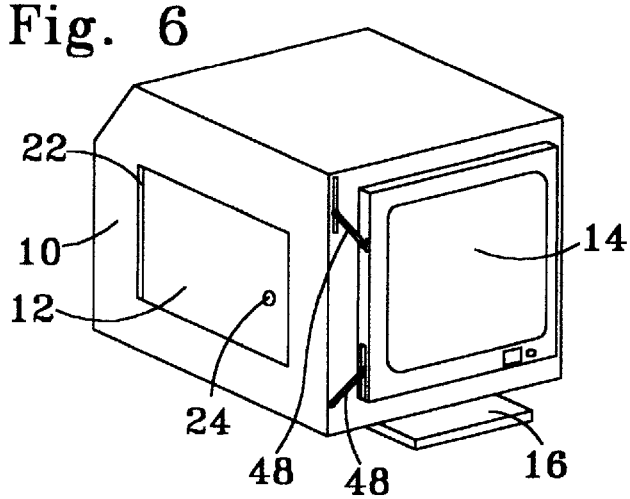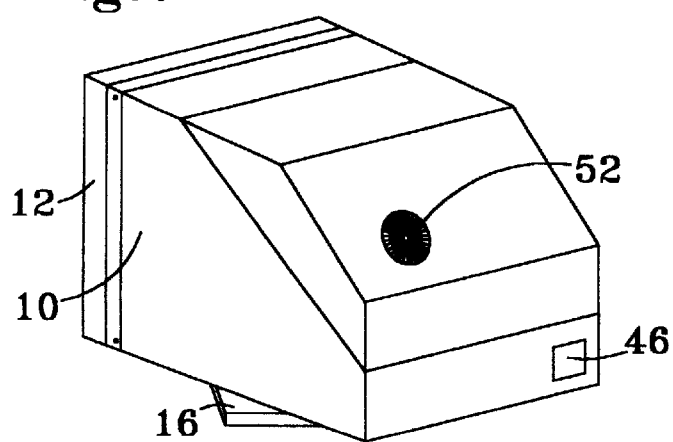

REFRIGERATOR WITH VIDEO MONITOR WORKSTATION

BACKGROUND OF THE INVENTION

The present invention relates to the field of video monitors. More particularly, the invention relates to a workstation integrating the functions of a flat screen monitor with a refrigerator for cooling and storing products.

Computer workstations incorporate a video monitor with a keyboard and central processing unit. Workstations can be linked to a central processing unit or can comprise an autonomous personal computing unit. The space requirements of workstations devote significant space to conventional cathode ray tube (CRT) video monitors, and such monitors typically occupy more desk space than any other workstation component. Computer workstations facilitate business activities, personal recordkeeping, and personal recreation through video games and internet access. Workstation operators sit or stand while manipulating a keyboard or touch screen switches to access and manipulate data transmitted between the video monitor and a processing unit. The keyboard can be integral with or separate from the processing unit.

Significant effort has been devoted to improving the ergonomics and comfort of computer workstations. In particular, design effort has addressed the sizing, screen support, image display resolution, and display quality of video monitors. Workstation operators typically devote long, continuous hours at the workstation. With the exception of modest work breaks, many computer operators spend the entirety of each workday at workstation. The physical and mental demands of continuous workstation operation has led to the development of new technology addressing workstation furniture, lighting, decorations, and accesssories.

Beverage and snack breaks require a temporary abandonment from the workstation so that a visit to a centralized kitchen or vending area can be made. Significant productivity losses occur because the interruption typically leads to office socializing with other employees, randomly interrupting overall work flow at intervals outside of scheduled breaks. In addition to such productivity losses, common area refrigerators present sanitation problems, opportunity for theft or altered products, commingling of food from unknown origins, and other problems.

Many workstation operators are so engrossed in their work that the operators eat and consume beverages to avoid loss in concentration or to avoid loss of internet connection access. To avoid separation from the workstation, workstation operators often stock a portable cooler at the workstation with beverages and perishable food products. Such coolers comprise polystyrene or plastic coolers having an insulated wall, and can be cooled with expendable ice or with refrigeration devices such as "thermoelectric (TEC) units. Beverage coolers are bulky and are not conventionally integrated into workstation furniture design. The cooler door is typically located on the top surface, leading to floor placement at the workstation operator's feet. This location occupies valuable square footage in office design and prevents a tripping hazard.

Another conventional solution for storing perishable products in an office environment is to position a compact vapor compression or absorption type refrigerator at or near the workstation. Such refrigerators discharge heat into the workstation environment and require significant floor space. Because efficiency conscious office designers do not conventionally provide for individual refrigeration units at each workstation, the addition of compact refrigerators typically comprises a design afterthought which leads to inconvenient placement and tripping hazards.

In addition to the difficulties of providing access to refrigerated products, various electronic controls have been developed for personal use in the home and office. U.S. Pat. No. 4,286,331 to Anderson et al. (1981) and U.S. Pat. No. 4,843,833 to Polkinghorne (1989) disclosed home systems for monitoring and controlling appliance utilization. U.S. Pat. No. 5,419,148 to Kuehl et al. (1995) disclosed an electronic control mounting system for a refrigerator, and U.S. Pat. No. 4,404;813 to Paddock et al. (1983) and U.S. Pat. No. 4,966,004 to Midlang et al. (1990) disclosed door mounted electronic refrigerator devices. U.S. Pat. No. 5,657,378 to Haddock (1997) disclosed a digital screen phone terminal, and U.S. Pat. No. 5,838,775 to Montalbano (1998) also disclosed an interactive interface for a phone video screen. None of these systems provide convenient access between a computer workstation and stored products.

A need exists for an improved system for relocating refrigeration equipment in an environment dominated by a computer workstation. The system should be economic to construct, should be flexible to implement, and should facilitate continuous workstation operation.

SUMMARY OF THE INVENTION

The present invention provides a cooling apparatus for storing goods. The apparatus comprises a container having an interior space for storing the goods and having a door for selectively accessing said container interior space, a refrigerator engaged with the container for cooling the container interior space, and a flat screen video monitor attached to the container for permitting display of graphic information while permitting access through the door opening to the stored goods.

In different embodiments of the invention, the apparatus can include a controller for transmitting information to the monitor for display, and can include a keyboard for generating information for display or for communication. The video monitor can be attached to different sides of the container and can be positioned as a selected distance from the container to facilitate viewing. A rotatable base permits rotation of the container for orientation of the video monitor. The container and flat screen video monitor can be portable to extend the flexibility of workstation operation.

BRIEF DESCRIPTION OF THE DRAWINGS

FIG. 5 illustrates two access doors through a container wall.

FIG. 6 illustrates a frame for supporting a video monitor at a selected distance from the container.

FIG. 7 illustrates a blower fan on the outside of a container surface.

DESCRIPTION OF THE PREFERRED EMBODIMENTS

The invention provides an improved workstation for permitting continuous operation with minimal disruption.

The invention integrates the space saving qualities of flat, electronic panel displays with the functional storage and cooling functions of a refrigeration unit.

Figure 1:
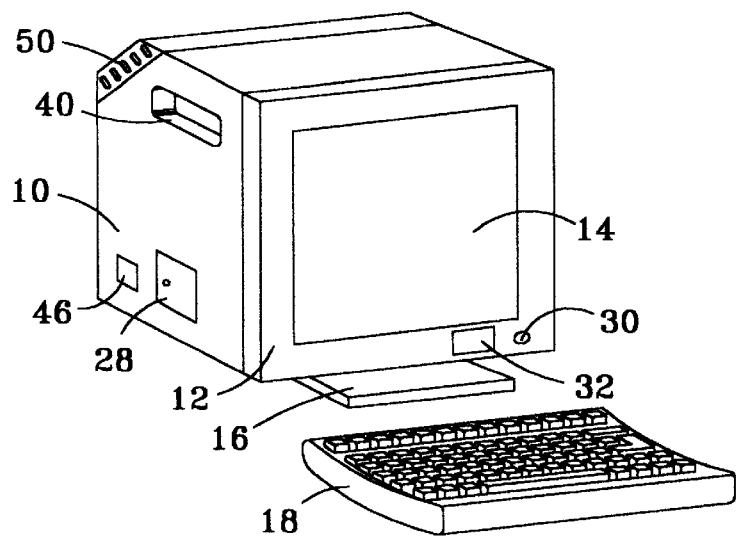
FIG. 1 illustrates a container having a video monitor integrated within a door to the container.
Figure 2:
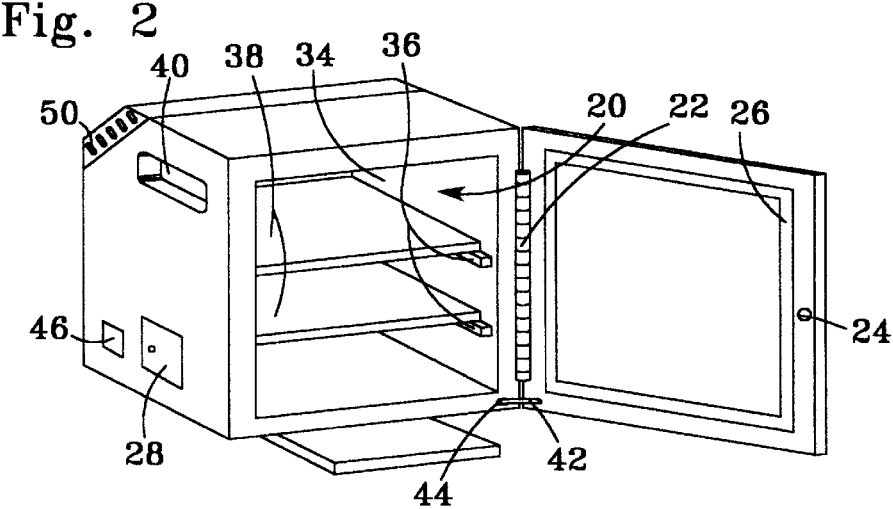
FIG. 2 illustrates a container having an open door.

Referring to FIG. 1, container 10 includes door 12, flat panel video monitor 14 attached to door 12, base 16, and keyboard 18. As shown in FIG. 2, container 10 has an interior refrigerated space 20 defined by the walls of container 10. One wall of the refrigerated space 20 provides structural support for flat panel video monitor 14. In one embodiment of the invention, container 10 includes a top, bottom, side walls and a rear wall. Container 10 can be formed with various materials such as urethane foam, vacuum panels, or combinations of these or other materials. Door 12 selectively opens and closes the wall space defining an access into the interior of container 10. Door 12 is attached to container 10 with one or more hinges 22, and is closed relative to container 10 with a latch, spring loaded mechanism, magnet, or other closure device 24. Gasket 26 seals the gap between door 12 and container 10 and is slightly compressed when door 12 is closed relative to container 10.

Although door 12 could be opaque, door 12 could also be transparent or have clear windows for viewing of the interior space within container 10. Second door or access panel 28 can be attached to a side of container 10 to provide viewing capability or physical access to a selected location within space 20. An "on" indicator light 30 can indicate operation, and LCD temperature and time display 32 can attached to door 12. An inside liner 34 within container 10 can be constructed with a food grade, vacuum formed high gloss ABS material. Molded shelf brackets 36 provide for installation of adjustable shelves 38 and one or more handles 40 can be molded into container 10 to facilitate transport and handling.

Flat panel video monitor 14 can be integrated within door 12 and comprises a screen for displaying graphic images. Power and signals are transmitted between container 10 and video monitor 14 with cabling 42 run through pathway 44. Electronic controller 46 can be attached to video monitor 14 as illustrated, to door 12, or to a separate keyboard 18 in communication with controller 10.

Figure 3:
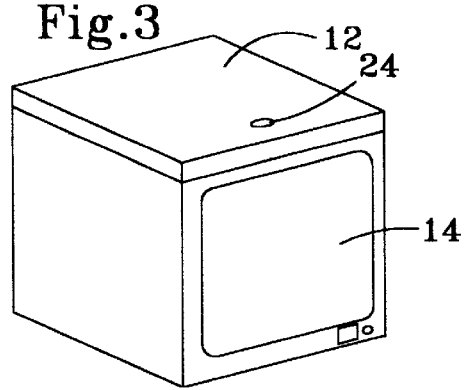
FIG. 3 a door operable on the top of a container.
Figure 4:
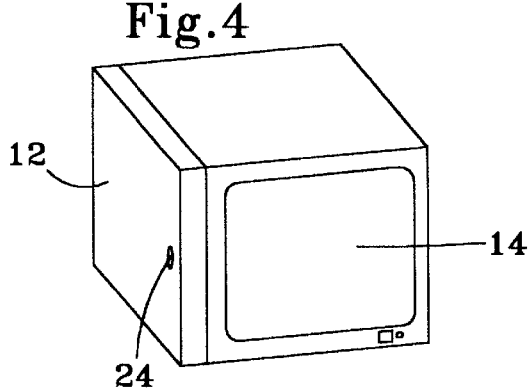
FIG. 4 illustrates a door operable on the side of a container.

Although monitor 14 is illustrated as being integrated within door 12, monitor 14 could be integrated into other sides of container 10. For example, monitor 14 could be integrated into a fixed side of container 10, with door 12 opening on the top as shown in FIG. 3, or on a side of container 10 as shown in FIG. 4. Although one door 12 is illustrated, two or more doors 12 or access panels 28 could be integrated into container 10 as shown in FIG. 5 to access different portions of the interior space 20 within container 10. While video monitor 14 can be integrated within container 10 or door 12, video monitor 14 can also be attached to container 10 with frame 48 as shown in FIG. 6 to position video monitor 14 closer to the operator A representative dimension for flat panel video monitor 14 can be one inch thick and twenty inches wide. These dimensions are described for illustrative purposes only, and will change as additional flat panel video monitor technology becomes available.

Refrigerator 50 is attached to container 10 to cool interior space 20 and can comprise a conventional vapor compression system, however such systems are typically noisy and space consuming. Conventional compact refrigerators are broadly defined as any refrigerator having an internal storage capacity less than 4.5 cu. ft. (127 liters). Common compact refrigerators are 1.7 cu.ft. (50 liters) cooled with vapor compression or absorption systems within a painted or vinyl clad metal outer case. Compact vapor compression or absorption refrigerators have net storage limitations due to the irreducible size of the cooling systems. Because the efficiency of thermoelectrically cooled refrigerators increases as the cooled space decreases, small containers less than 1.7 cu.ft. operate more efficiently with thermoelectric cooling systems.

Preferably, refrigerator 50 comprises a thermoelectric cooler or uses refrigeration technologies such as Sterling cycle, complex compound adsorption, or thermoacoustic techniques. In a preferred embodiment of the invention, refrigerator 50 comprises an efficient thermoelectric assembly utilizing the Peltier effect whereby heat is electrically transported from a cold surface inside of the refrigerated space 20 to a heat dissipating surface located outside of the refrigerated space 20. Such devices are powered with low voltage direct current converted from an alternating current source. A representative example is a 12 volt, 5 amp thermoelectric module rated at 20 watts maximum. A thermostat can be proportional, variable control, solid state, or analog. A power supply can operate from a 110 VAC input having a 13.5 VDC output at 5 amps. Refrigerator 50 can be automatically or manually controlled, and automatic control can be integrated with on-board circuitry or can be controlled remotely by software connected with monitor 14. Thermocouple or thermistor temperature sensor can be incorporated to monitor the temperature of the space within container 10. A fan or blower 52 such as that shown in FIG. 7 can facilitate heat removal from heat collecting and heat dissipating surfaces mounted interior and exterior of container 10.

Although the invention is particularly useful in a commercial computer workstation, the invention is also useful for uses such as for viewing television, monitoring personal finances, playing games, receiving and transmitting electronic mail messages, and other uses. Sporting events can be viewed within reach of chilled beverages. Instead of a large central refrigerator, the invention facilitates "distributed" refrigerator systems located at different positions within a selected space. In addition to the significant range of relatively stationary uses, the invention is uniquely portable to any site accessible by an operator. Container 10 provides a carrying case for storing and transporting video monitor 14 to different site. Operation of refrigerator 50 and monitor 14 can be powered with on-site power or with a battery (not shown) stored within container 10. This feature of the invention provides the cooling capability provided with conventional ice chests and portable coolers, but further includes the unique capabilities of a portable computing, information processing, message transmission and reception, and game play system. The invention is applicable to in-vehicle uses such as automobile, truck, sporting and recreation uses to non-vehicle uses.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A cooling apparatus for storing goods, comprising:
   a container having an interior space for storing the goods and having a door over a door opening for selectively accessing said container interior space;

a refrigerator attached to said container for cooling said container interior space; and a flat screen video monitor engaged with said container for permitting display of graphic information while permitting access through said door opening to the stored goods.

2. An apparatus as recited in claim 1, wherein said monitor is attached to said door and is moveable relative to said container when said door is opened and closed.

3. An apparatus as recited in claim 1, wherein said flat screen video is attached to said container so that operation of said container door does not interrupt viewing of said monitor.

4. An apparatus as recited in claim 1, wherein said container is portable.

5. An apparatus as recited in claim 4, further comprising a battery attached to said container for providing direct current to said refrigerator.

6. An apparatus as recited in claim 1, wherein said refrigerator comprises a thermoelectric cooler.

7. An apparatus as recited in claim 1, further comprising a keyboard for displaying information on said monitor.

8. An apparatus as recited in claim 1, further comprising a controller engaged with said monitor for generating information and for transmitting such information to said monitor for display.

9. An apparatus as recited in claim 1, further comprising a modem connected to said monitor and to a communications link for permitting information to be received for display on said monitor.

10. An apparatus as recited in claim 1, wherein said monitor is detachable from said container.

11. An apparatus as recited in claim 1, wherein said monitor is engaged with said container at a selected distance from said container.

12. An apparatus as recited in claim 1, further comprising an articulated base attached to said container for permitting rotational movement of said container.

13. An apparatus as recited in claim 1, further comprising a second door through said container for providing access to said container interior space.

14. A portable cooling apparatus for storing goods, comprising:

a container having an interior space for storing the goods and having a door over a door opening for selectively accessing said container interior space;

a hinge attached to said door and to said container for controlling movement of said door relative to said container;

a refrigerator engaged with said container for cooling said container interior space;

a flat screen video monitor attached to said container for permitting display of graphic information while permitting access through said door to the stored goods; and a communication link for engaging a data source to said video monitor.

15. An apparatus as recited in claim 14, further comprising a battery attached to said container for providing direct current power to said monitor.

16. An apparatus as recited in claim 14, further comprising a controller attached to said container, said battery, and said monitor for providing data to said monitor for display.

17. An apparatus as recited in claim 16, further comprising a keyboard attached to said controller.

18. An apparatus as recited in claim 14, further comprising a keyboard attached to said container and engaged with said video monitor for controlling graphic displays on said monitor.

* * * * *